United States Patent [19]
Jones et al.

[11] Patent Number: 5,275,852
[45] Date of Patent: Jan. 4, 1994

[54] SIMULATED STONE PRODUCT

[76] Inventors: Anthony H. Jones, 8427 Lichen Dr., Citrus Heights, Calif. 95621; Paul G. Howard, 8061 Dana Butte Way, Citrus Heights, Calif. 95610

[21] Appl. No.: 623,303

[22] Filed: Dec. 6, 1990

[51] Int. Cl.$^5$ ............................................. B44F 9/04
[52] U.S. Cl. ..................................... 428/15; 428/147
[58] Field of Search ................................. 428/15, 147

[56] References Cited

U.S. PATENT DOCUMENTS

| | | | |
|---|---|---|---|
| 3,396,067 | 8/1968 | Schafer | 428/15 X |
| 3,508,945 | 4/1970 | Haemer et al. | 428/15 X |
| 3,928,047 | 12/1975 | Kapolyi et al. | 428/15 X |
| 3,981,840 | 9/1976 | Yamamoto et al. | 523/303 |
| 3,998,840 | 12/1976 | Williams III et al. | 528/41 X |
| 4,031,285 | 6/1977 | Miller et al. | 428/119 X |
| 4,343,752 | 8/1982 | Cann | 428/15 X |
| 4,446,177 | 5/1984 | Munoz et al. | 428/15 |
| 4,664,954 | 5/1987 | Hurd | 428/15 |
| 4,908,257 | 3/1990 | Baskin | 428/15 X |
| 5,043,377 | 8/1991 | Nogi et al. | 524/437 |

OTHER PUBLICATIONS

Winfield, A. G. "Cultured Stones: Decorative Embedments In Plastic." SPE Journal, Aug., 1966, pp. 36–39.

*Primary Examiner*—Henry F. Epstein
*Attorney, Agent, or Firm*—Joseph E. Gerber

[57] ABSTRACT

A sodium chloride filler for resin-based simulated stone products is disclosed, as well as a simulated stone product including the sodium chloride filler, and a method of preparing same. The product includes a resin base, a catalyst capable of polymerizing the resin and particulate sodium chloride. Pigments and other fillers may be included to yield special aesthetic effects. The method of the invention comprises the steps of mixing a quantity of the resin with catalyst and particulate sodium chloride, and perhaps pigment and other fillers. Two sodium chloride filler particle size ranges are preferred. Finally, the mixture is transferred to a mold, the mold having been coated with a gel coat, and/or a coat of resin with an alternative filler, in preparation for receiving the mixture. A kit including the foregoing ingredients and instructions for combining same is also within the scope of the invention.

11 Claims, No Drawings

SIMULATED STONE PRODUCT

BACKGROUND OF THE INVENTION

1. Field of the Invention

The present invention relates generally to filled synthetic resin compositions, and more specifically to a simulated stone product for use as a basic building material for fabricating all manner of manufactured items, and a method for preparing same.

2. Description of the Related Art

Simulated stone products first appeared commercially in the mid 1950's. See A. G. Winfield, "Cultured Stones: Decorative Embedments in Plastic"; SPE Journal, vol. 22; August, 1966, pp. 36–39, published by the Society of Plastics Engineers, discussing early formulations of these products. Today, as then, several basic ingredients are combined in various ways to yield products resembling marble, onyx, granite and the like. These ingredients generally include a curable synthetic resinous liquid base, a catalyst for curing the resinous base and a particulate solid filler. Aesthetically pleasing veinated and variegated patterns are achieved by adding pigments to the foregoing.

Resins commonly employed include those of the polyester and epoxy varieties, although urethane, styrene, acrylic and cementitious resins have also been used. Clear and translucent resins are particularly preferred. Examples of resin use in the art, including the required catalysts and curing processes, are representatively discussed in references such as U.S. Pat. No. 3,396,067 issued to Schafer in 1968 disclosing an early filled simulated onyx product. Or note U.S. Pat. No. 4,343,752 issued to Cann in 1982 which discloses a product having aesthetically pleasing pigmented patterns and a method of preparing same. Another such product is shown in U.S. Pat. No. 4,664,954 issued to Hurd in 1987. Also see U.S. Pat. No. 4,446,177 issued to Munoz, et al. in 1984 which discloses a laminated product, and U.S. Pat. No. 4,908,257 issued to Baskin in 1990 disclosing a simulated stone having inclusions resembling stone chips.

The foregoing references also disclose a great variety of fillers that have been used in combination with resins in producing simulated stone products. These include alumina trihydrate, aluminum silicate, antimony oxide, boracite, borax, calcium carbonate, frit, diatomaceous earth, glass flour, gypsum, illite, marble dust, onyx flour, quartz flour, sand, silica flour, talc powder and titanium dioxide. Of these, alumina trihydrate is the modernly preferred filler for onyx-type products, partly for its superior appearance when mixed with resin, and partly for its superior fire retardance. Alumina trihydrate, when combined with other fillers, is also useful in enhancing the appearance and fire retardance of other simulated stones such as marble, granite and the like. However, alumina trihydrate is relatively expensive, as are most of the aesthetically acceptable alternative fillers.

Further, products made with alumina trihydrate often vary in color from batch to batch, causing difficulty in matching individual items to one another. And whiteness, a highlysought quality in simulated stone fillers, is not always optimum with alumina trihydrate; undesirable gray, yellow and almond tints present recurring problems.

Thus, it appears that a need exists for a very low cost filler yielding a superior and consistent appearance when mixed with resin. This filler should also lend fire retardance to the product and present a minimal health hazard in the work environment.

SUMMARY OF THE INVENTION

The product of the present invention is adapted to overcome the above-identified shortcomings and to fulfill the stated needs. In sum, the product comprises a resin-based simulated stone including a sodium chloride filler. The starting ingredients of an illustrative product include an uncured resin base, a catalyst capable of polymerizing the resin, and sodium chloride particles. Pigments and other fillers may be added to yield aesthetic effects.

The method of the invention comprises the steps of mixing a quantity of polymerizable resin with a catalyst and particulate sodium chloride, and perhaps pigment and other fillers to produce such effects as swirls, veins and variegated patterns. Finally, the mixture is transferred to a mold, the mold having been coated with a gel coat, and/or a coat of resin with an alternative filler, in preparation for receiving the mixture.

A kit including the foregoing ingredients and instructions for combining same is also within the scope of the invention.

The inventive product is ideal for cast countertops, sinks, tubs, slabs, panels, tiles, statuary, furniture, trophies and all manner of other manufactured items. Although it takes a bit more sodium chloride than alumina trihydrate to yield a product of equivalent strength, at approximately one quarter of the cost of alumina trihydrate, significant savings are nevertheless realized. And, savings are enhanced by the corresponding offset in the amount of expensive resin needed; tests indicate that resin volume may be reduced by at least 15–20%. Cost analyses comparing equivalent batches of alumina trihydrate versus sodium chloride-filled onyx product suggest that the latter can be produced for some 57% of the cost of the former.

Curing the sodium chloride filled product generally takes somewhat longer than alumina trihydrate-filled products but, in any case, leaving either product overnight is sufficient.

The higher ratio of solid to resin also yields an aesthetically superior product because sodium chloride has better translucence; i.e., more can be added to the resin without making the final product opaque. Experimentation also shows that less color variation exists from batch to batch of simulated stone products made with sodium chloride, in contrast to alternative fillers. This significantly reduces decorating problems commonly encountered in using such simulated stone products. Further, the sodium chloride-filled product is whiter than alumina trihydrate-filled equivalents, whiteness being a vigorously sought, highly touted, but seldom achieved quality in fillers.

The inventive product also excels in durability. Repeated thermal shock within the ranges of temperature common to household water systems are well endured. Surface crazing, a persistent problem with some simulated stone products, has not been observed.

Safety is also enhanced in simulated stone products incorporating sodium chloride. Flame tests, as expected, indicate that the sodium chloride filler itself will not ignite. And, when a sodium chloride-filled, resin-based simulated stone product is ignited, it exhibits an ability to extinguish itself similar to that of products including alumina trihydrate.

In the manufacturing process, worker safety is unmatched. Even heavy exposures create little risk of problems beyond minor irritation. Sodium chloride salt, being the ubiquitous substance that it is, enjoys great familiarity by most people in its proper method of use and storage.

In light of the above, it is an object of the present invention to provide a low-cost filler for resin-based simulated stone products.

It is a further object of the present invention to provide a highly fire retardant filler for such stone products.

Yet another object of this invention is to provide such a filler that is exceedingly safe to use in the working environment.

Yet a further object of the present invention is to provide a simulated stone product filler yielding superior translucence and other aesthetic qualities when combined with resin.

Still a further object of the present invention is to provide a resin-based simulated stone product incorporating the inventive filler herein, and therefore having all of the desirable qualities noted above.

And it is also an object of the present invention to provide a method of preparing a resin-based simulated stone product having all of the desirable qualities noted above.

Still further objects of the invention will be apparent from the following detailed description thereof.

DETAILED DESCRIPTION OF THE PREFERRED EMBODIMENTS

The present invention is directed to a novel filler for resin-based simulated stone products, a novel simulated stone product including the filler, and a kit for, and method of, preparing same.

The filler herein is particulate sodium chloride salt. Pure food grade salt has been used with success in replacing alumina trihydrate in standard processes for producing simulated onyx.

The sodium chloride herein is preferably finely divided, particles of approximately 70 U.S.S. mesh and smaller having been found to work well in practicing the invention. For optimum strength in a resin-based simulated stone product, sodium chloride particles of two different size ranges seem to work well together, the smaller particles presumably filling spaces between the larger. In practice, a first particle size range of approximately 70 to 140 mesh is employed, these being the larger particles. The smaller particles range from about 200 mesh and up, an average of about 50% of the particles being above 325 mesh.

The two size ranges of sodium chloride particles used with success herein are available as food grade salt from the Leslie Salt Company, 7200 Central Avenue, Newark, Calif. 94560. The sodium chloride product having the larger particles is designated by the company as "Vacuum Blending Salt—PHG [premium high grade] Extra Fine," and described in its Salt Technical Data sheet as "an extra fine screened, granular, white crystalline solid. It is manufactured by vacuum evaporation of chemically purified brine, and exhibits a high sodium chloride content." The complete sieve analysis of same is as follows:

| U.S.S. Mesh | Minimum | Average | Maximum |
| --- | --- | --- | --- |
| 50 | 0 | 2 | 8 |
| 70 | 25 | 38 | 51 |
| 100 | 33 | 48 | 63 |
| 140 | 4 | 10 | 16 |
| 200 | 0 | 2 | 4 |
| Pan | 0 | Trace | 1 |

The product having the smaller particles is designated as "Vacuum Micro Powder Salt—PHG Micro-140," and described in the company's Salt Technical Data sheet as "a pulverized, white crystalline powder. It is manufactured by grinding high purity vacuum evaporated salt." The complete sieve analysis of this more finely divided filler is as follows:

| U.S.S. Mesh | Minimum | Average | Maximum |
| --- | --- | --- | --- |
| 50 | 0 | 1 | 2 |
| 100 | 0 | 2 | 4 |
| 140 | 3 | 7 | 11 |
| 200 | 4 | 12 | 20 |
| 325 | 8 | 29 | 50 |
| Pan | 22 | 49 | 76 |

The method of preparing a resin-based simulated stone product incorporating the novel sodium chloride filler closely tracks the standard methods used in the trade with other fillers. A simulated onyx product may be prepared by first isolating a quantity of liquid polyester resin in a mixing vessel. One polyester resin used with success is a product identified as "S793-C," this being available from BP Chemicals, Inc.—Silmar Resins, located at 12333 South Van Ness Avenue, Hawthorne, Calif. 90250. S793-C is an orthophthalic, unsaturated polyester resin comprised of styrene monomers.

A liquid catalyst is then added to the resin to begin the polymerization process. The amount of catalyst used is generally 1-2% of the resin, by weight. As is known in the art, the amount of catalyst ultimately needed or desired depends upon many factors including the ambient temperature where the reaction is taking place.

The catalyst product used with success herein is methyl ethyl ketone peroxide identified as "Cadox M-50" and available from Akzo Chemical, Inc. at 300 South Riverside Plaza, Chicago, Ill. 60606.

The resin and catalyst are mixed until sufficiently blended. As an example of a typical batch, 98 parts of resin are mixed with 2 parts of catalyst, by weight, at an ambient temperature of 70° F. Slightly more, on the order of a half part, or so, may be required if ambient temperatures are lower. Mixing is carried out either by hand, or with the aid of a mechanical mixing machine, the duration of mixing preferably being that which is sufficient to achieve a thorough blend.

The inventive sodium chloride filler may be added immediately after blending the resin and catalyst. It has been found that blending is facilitated if the filler is first sifted through a screen to break up lumps. Best results are achieved when particles of the two size ranges, the larger and the smaller, are mixed in a 1:1 ratio, by weight, before being added to the resin-catalyst mixture.

Continuing with the example above using 100 parts resin-catalyst mixture, by weight, some 260 pounds, or so, of 1:1 sodium chloride filler mixture is blended in.

That is, approximately 130 pounds of each particle size range are used, yielding a final filler to resin-catalyst ratio of some 2.6:1. These ratios are offered by way of example only. Mixes of anywhere between 2:1 and 3:1, and higher, filler to resin-catalyst, have been used with success.

At this point, a pigment such as titanium dioxide may be added to achieve the familiar swirled pattern of onyx. For the best aesthetic results, pigments are preferably distributed through the mixture with a minimal number of blending strokes. That is, the pigment is carefully folded into the mixture. This achieves the best defined interface between the swirls of opaque pigment and the translucent background matrix.

This stone mixture of resin, catalyst, filler and pigment is then transferred to a mold that has been prepared with a gel coat to cover the surface of the simulated stone. Care must be taken to assure that all future exposed surfaces of the molded item will be covered with gel coat; this prevents crystallization of the cured mixture's surface and marring of its appearance. The gel coat product used with success herein is designated as "66-X126" and is available through Lilly-Ram Industries, 210 East Alondra Boulevard, Gardena, Calif. 90248. The 66-X126 is comprised of isoneopentyle glycol resins, as well as agents to increase this gel coat's ability to adhere to sloped and vertical surfaces. The 66-X126 is catalyzed in the same manner as the resin above using the Cadox M-50 catalyst. The gel coat-catalyst mixture is then sprayed into the mold, lining all its surfaces. Once the gel coat sets up, the stone mixture is added to the mold behind it and the entire combination is left to set. Curing overnight is generally sufficient.

As is known in the art, the ratios of the above ingredients may be altered widely to address varying needs for strength, density, translucence, fire retardance and cost in the final simulated stone product. Ratios ranging up to 10:1 of either the resin to filler, or vice versa, may occasionally be optimum in addressing special purposes, but ratios closer to those described above are preferred and suitable in most conventional applications.

Once blended, other fillers may be added to the mix to achieve desired visual effects. Accommodation of such fillers may be one reason for varying the initial ratios of sodium chloride to resin-catalyst. For example, calcium carbonate may be used in combination with the inventive filler to achieve the appearance of granite, this having been done with success. Similar techniques already well known in the art may be employed to yield other types of simulated stone. Overall, the particulate sodium chloride described herein may be substituted for alumina trihydrate in any recipe, slightly higher ratios of sodium chloride to resin normally being needed to achieve similar results.

The inexpensive stone product of the present invention may also be used in combination with more conventional, and perhaps more costly, simulated stone products. For example, should an alumina trihydrate-based surface be for some reason preferred on a manufactured article, the sodium chloride product of the present invention could be back-filled in behind the alumina trihydrate-based surface layer. That is, a layer a fraction of an inch thick of another simulated stone product, perhaps covered by a gel coat, could be given strength and support from beneath with the product of the present invention.

It is also contemplated that this inventive filler, and the other ingredients with which it is preferably combined, comprise a kit for making such a simulated stone product. Such a kit would also, necessarily, include instructions similar to those above for carrying out the inventive method.

The foregoing detailed disclosure of the inventive filler, simulated stone product and method is considered as only illustrative of the preferred embodiments of, and not a limitation upon the scope of, the invention. Those skilled in the art will envision many other possible variations in the recipe and method of use of the inventive sodium chloride filler disclosed herein that nevertheless fall within the scope of the following claims. And, alternative uses for this inventive filler, product and method may later be realized. Accordingly, the scope of the invention should be determined with reference to the appended claims, and not by the examples which have herein been given.

We claim:

1. A resin-based simulated stone product including a sodium chloride filler, wherein said sodium chloride filler is particulate and of two particle size ranges, a first having a majority of particles between 70 and 140 U.S.S. mesh, and a second having a majority of particles above U.S.S. 200 mesh.

2. A simulated stone product comprising:
   a. resin
   b. a catalyst capable of polymerizing said resin; and,
   c. sodium chloride filler.

3. The product of claim 2 further including pigment.

4. The product of claim 2 further including a gel coat.

5. The product of claim 2 wherein said sodium chloride filler is particulate.

6. The product of claim 2 wherein said sodium chloride filler is comprised of two physical species, a first being a granular, crystalline solid and a second being a pulverized, crystalline powder.

7. The product of claim 6 wherein said filler of said first physical species is in a ratio of approximately 1:1 to said filler of said second physical species, by weight.

8. The product of claim 2 wherein said sodium chloride filler is of two particle size ranges, a first having a majority of particles between 70 and 140 U.S.S. mesh, and a second having a majority of particles above U.S.S. 200 mesh.

9. The product of claim 8 wherein said filler of said first particle size range is in a ratio of approximately 1:1 to said filler of said second particle size range, by weight.

10. The product of claim 2 including the elements thereof in a ratio approximating 1 part resin and catalyst, and 2.6 parts sodium chloride, by weight.

11. The product of claim 2 further including particulate calcium carbonate.

* * * * *